United States Patent Office 3,472,862
Patented Oct. 14, 1969

3,472,862
4H - 4 - HYDROXY - 5 - HYDROXYMETHYL - 8-
METHYL - m - DIOXINO[4,5-c]PYRIDINE - 5-
PHOSPHATE AND DERIVATIVES
Gustav Schorre, Darmstadt-Eberstadt, Germany, assignor to E. Merck A.G., Darmstadt, Germany
No Drawing. Filed Jan. 30, 1967, Ser. No. 612,360
Claims priority, application Germany, Feb. 9, 1966, M 68,318
Int. Cl. C07d 99/04
U.S. Cl. 260—297                4 Claims

ABSTRACT OF THE DISCLOSURE

Derivatives of pyridoxal-5′-phosphate of the formula:

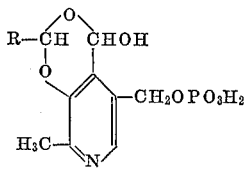

wherein R represents hydrogen, methyl, or ethyl.

These derivatives, being easily separable and substantially insensitive to light, oxidation, and mineral acids, have the same field of utility as pyridoxal-5′-phosphate and can be converted to the latter.

SPECIFICATION

Applicant hereby claims the benefit of the filing date of German patent application M 68,318 of Feb. 9, 1966.

This invention relates to novel derivatives of pyridoxal-5′-phosphate.

It is known that pyridoxal-5′-phosphate is very sensitive to light and oxygen, being discolored in air after only a few minutes. Furthermore, this compound is relatively difficult to separate in a pure state from its synthesis reaction mixture.

An object of this invention, therefore, is to provide novel derivatives of pyridoxal-5′-phosphate having the same field of utility and which are relatively insensitive to light and oxidation.

Another object is to provide a process for producing these novel derivatives, as well as a process for converting these derivatives to pyridoxal-5′-phosphate.

Still other objects include pharmaceutical compositions and methods of administration to mammals, based on these novel derivatives.

Upon further study of the specification and claims, other objects and advantages of the present invention will become apparent.

For the attainment of the above objects, there are provided derivatives of pyridoxal-5′-phosphate of the formula:

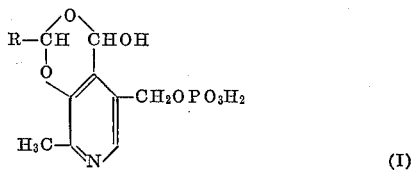

wherein R represents hydrogen, methyl, or ethyl.

These novel compounds, in the same manner as pyridoxal-5′-phosphate itself, are not only effective as coenzymes of amino acid decarboxylases, transaminases, and racemases, but also have important advantages thereover. Whereas the pyridoxal-5′-phosphate is very sensitive to light and oxidation and discolors, for example, in air after only a few minutes, the novel compounds of Formula I are surprisingly insensitive to light and oxidation. Thus, they can be stored readily for prolonged periods of time without special precautionary measures. Moreover, they are also surprisingly highly stable against the effect of mineral acids. Therefore, from the previous considerations, they are substantially more suitable than pyridoxal-5′-phosphate for all uses where the latter compound has been employed.

Another important use is that the novel compounds are particularly suited for the purification and isolation of pyridoxal-5′-phosphate, especially from aqueous solutions thereof. The novel compounds are substantially insoluble in water, and can be produced, practically quantitatively, in a state of high purity. They can be subsequently readily cleaved to form pyridoxal-5′-phosphate. From an economic standpoint, there is thus obtained a very advantageous process for the isolation and/or purification of pyridoxal-5′-phosphate.

According to all previously known processes for the production of pyridoxal-5′-phosphate, this compound has been obtained in very impure reaction mixtures. This is particularly the case in the process conducted most frequently on a technical scale, wherein the pyridoxal-5′-phosphate must be isolated from the obtained phosphorylation mixture. Normally, these reaction mixtures must be subjected to prolonged separation processes with the aid of exchangers. Such working-up processes are inherently disadvantageous because substantial proportions of pyridoxal-5′-phosphate always adhere to the exchange agent, and are not recovered. Also, large volumes of the thus-obtained eluates containing the easily oxidizable and very sensitive pyridoxal-5′-phosphate must be evaporated. It is readily apparent, therefore, that the isolation of pyridoxal-5′-phosphate from its solutions by using the novel compounds of this invention represents a significant advance in the production of pyridoxal-5′-phophate. It is now possible, for the first time, to isolate pyridoxal-5′-phosphate in the form of a derivative, which derivative can be readily reconverted to pyridoxal-5′-phosphate, in almost quantitative amounts, from its reaction mixtures.

The compounds of this invention can be produced by simply reacting pyridoxal-5′-phosphate, or a derivative thereof functionally modified in the aldehyde group, in an acidic aqueous solution, with an aldehyde of the formula RCHO (R having the above-indicated meaning). Suitable aldehydes, in addition to formaldehyde, are acetaldehyde and propionaldehyde. The formaldehyde can be employed as such, in an aqueous solution, or also as paraformaldehyde. Corresponding considerations apply with respect to acetaldehyde, which can likewise be used in the monomeric form or as paraldehyde. The addition of organic solvents is not necessary; however, rather small amounts of water-miscible solvents can be tolerated. Normally, the reaction is conducted at room temperature, but temperatures from about 0° C. to 70° C. can be employed. At higher temperatures, the reaction times are reduced. As a general rule, the reaction mixture is allowed to stand for several hours at room temperature, suitably about 1–5 hours, or, in case the mixture is heated, only about 10 minutes to 2 hours.

Before or after the addition of the aldehyde of the formula RCHO, the pH of the reaction mixture is adjusted to a value of 1–3, preferably 1.8–2. If the starting materials are acidic phosphorylation mixtures produced during the production of pyridoxal-5′-phosphate from pyridoxal or from pyridoxal oxazolidines, the pH is suitably adjusted by the addition of alkalis, such as NaOH, KOH, sodium acetate, alkali metal carbonates, or bicarbonates; these can all be added either as solids or in the form of an aqueous solution. In all other cases, the pH value of the aqueous solution can be adjusted in a conventional manner, depending upon the starting material employed, by the addition of acids or alkalis until the desired pH range is obtained. After a short period of time, when maintaining this pH value, the compounds of Formula I precipitate from the aqueous solution. In order to increase the yield, the reaction mixture is suitably allowed to stand for several hours under cooling, for example, overnight at temperatures of about 0° C. The precipitated compounds can be separated in a conventional manner, for example, by filtration.

If the compounds of this invention are to be reconverted into pyridoxal-5'-phosphate, this can be done quite simply. For example, the compounds of this invention can be hydrolyzed by strong aqueous mineral acids. Such hydrolysis is preferably conducted at moderately elevated temperatures (about 50–100° C.) for about 5 to 120 minutes, or alternatively, by allowing the mixture to remain at room temperature for a longer period of time (for example, 12 hours). The reaction can be conducted even more expeditiously by reacting the compounds of this invention with a solution of mineral acid, in absolute alcohol, preferably with hydrogen chloride in ethanol, into the corresponding diacetal. The diacetal changes subsequently, under the influence of mineral acids, such as, for example, hydrochloric acid, sulfuric acid, or phosphoric acid, in a conventional manner quantitatively into pyridoxal-5'-phosphate.

In general, it is also possible to liberate pyridoxal-5'-phosphate from the compounds of this invention by treating these compounds with such substances which are capable of binding the aldehydes of the formula RCHO more firmly than the pyridoxal phosphate. Thus, it is possible, for example, to split the compounds of Formula I obtained by reaction with formaldehyde (R=H) by treatment with ammonia in an aqueous solution, there being obtained the pyridoxal-5'-phosphate with the formation of urotropine. By acidifying and preferentially concentrating the solution, the pyridoxal-5'-phosphate readily crystallizes. Furthermore, it is possible, for example, to convert the compounds of this invention into pyridoxal-5'-phosphate by reaction with dimedone (5,5-dimethyl-1,3-cyclohexanedione). In this process, there are obtained, in addition to pyridoxal-5'-phosphate, the corresponding alkylidene-bis-dimethyl-dihydroresorcinol derivatives. The reaction is suitably conducted in a weakly acidic, preferably acetic acid, solution, at room temperature or with slight heating. Generally, the reaction terminates after a few minutes, and the separation of the reaction components is conducted in a conventional manner.

Starting materials for the novel process are, in addition to the pyridoxal-5'-phosphate proper, all the derivatives thereof having a functionally modified aldehyde group, particularly the hemiacetals, acetals, the oxime, semicarbazone, hydrazone, phenyl hydrazone, and phenyl hydrazones substituted in the phenyl group, such as, for example, dinitrophenyl hydrazone, or the Schiff bases formed witth primary amines. Although, generally speaking, all Schiff bases can be employed since the amino component does not influence the reaction, it is preferred to employ amines having no more than 14 carbon atoms, preferably lower aliphatic amines or anilines or benzylamines which are optionally substituted. These derivatives with a modified aldehyde group can be easily produced from pyridoxal-5'-phosphate by reaction with the corresponding carbonyl reactants, in a conventional manner. For the purposes of this invention, such derivatives having a modified aldehyde group will be defined as functional aldehyde derivatives of pyridoxal-5'-phosphate.

This invention thus provides both novel valuable compounds, and also processes for the purification of, or the isolation of pyridoxal-5'-phosphate from its aqueous solutions, by a subsequent cleavage of the compounds of this invention.

The novel compounds of this invention can be utilized in mixture with conventional pharmaceutical excipients.

Carrier substances can be such organic or inorganic substances suitable for parenteral, enteral, or topical application, and which do not react with the novel compounds, for example, water, vegetable oils, polyethylene glycols, gelatin, lactic sugar, amylose, magnesium stearate, talc, vaseline, cholesterol, etc.

For parenteral application, particularly suitable are ampoules containing solutions, preferably oily or aqueous solutions, as well as suspensions, emulsions, or implants. For enteral application, there can be used a solid form, such as tablets or dragees incorporating talc or carbohydrate binders. Syrups containing sweetened vehicles can also be employed.

For topical application, solutions, salves, or creams can be used which are, if desired, sterilized, or mixed with auxiliary substances, such as preservatives, stabilizers, or wetting agents, or salts for influencing the osmotic pressure, or with buffer substances.

In general, the amount of carrier per 1 mg. of active agent can range from 5 to 1000 mg.

The substances of this invention are preferably administered to mammals in dosages of 1 to 500 mg. per dosage unit. When administered orally, the preferred range is 10–250 mg., and when administered parenterally, the preferred range is 1–500 mg. In fatty creams and salves, the active ingredient is generally present in an amount of about 0.1–2% by weight, preferably 0.2%.

Pyridoxal-5'-phosphate is besides pyridoxine and pyridoxamine one of the vitamins forming the $B_6$-group (cf., for example, P. Holtz et al. in Pharmacological Review, vol. 16, p. 113 (1964)). Pyridoxal-5'-phosphate is the prosthetic group of a number of enzymes which ocntrol the protein metabolism. Pyridoxal-5'-phosphate as well as the novel compounds of the present invention are especially useful in those cases where a vitamin $B_6$ therapy is indicated and where the phosphorylation reactions in the body are disturbed. Indications for a vitamin $B_6$ therapy are, for example, skin defects, disturbances during pregnancy, and neuroses.

Furthermore, effects on the metabolism of fatty acids and carbohydrates have been observed. Another highly interesting field of application is the protection of mammals against injuries caused by ionizing rays (see, for example, Naturwissenschaften, vol. 51, page 407 (1964), and vol. 52, page 34 (1965)).

Preferred pharmaceutical preparations are
(a) A freeze-dried ampoule containing 250 mg. of a compound of Formula I
(b) A tablet containing 20 mg. of 4H-4-hydroxy-5-hydroxymethyl - 8 - methyl-m-dioxino[4,5 - c]pyridine-5-phosphate, 75 mg. potatoe starch, 4 mg. talc, 1 mg. magnesium stearate
(c) A fatty cream containing 0.2% of a compound of Formula I.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

(a) From 500 g. $P_2O_5$ and 650 g. $H_3PO_4$ (85%), polyphosphoric acid is produced; this polyphosphoric acid is mixed with 200 g. of a pyridoxal oxazolidine[2-(3'-hydroxy - 5' - hydroxymethyl-2'-methyl-pyridyl-4')-3,4-dimethyl-5-phenyl-L-oxazolidine], and heated for four hours to 60° C. Thereafter, 500 ml. water are added to the reaction mixture, and the solution is heated for ½ hour to about 80° C. After cooling to room temperature, the solution is mixed with 190 ml. 40% formaldehyde solution (or 50 g. paraformaldehyde). After allowing the reaction mixture to stand for about 2½ to 3 hours at room temperature, the pH value is adjusted to about 1.8–2 by adding aqueous NaOH. The solution is then allowed to stand overnight at 0–5° C. There precipitates, in the form of colorless crystals, 4H-4-hydroxy-4-hydroxymethyl-8-methyl-m-dioxino[4,5-c]pyridine - 5 - phosphate; this reaction product is vacuum-filtered and washed with water and acetone. Yield: 159 g. (=90% of theory). The compound does not melt but turns dark from 170° C. on.

(b) Into a solution of 450 ml. absolute ethanol and 40 g. HCl, 159 g. of the compound obtained according to Example 1(a) are introduced. The solution is mixed with 8 g. charcoal and refluxed for ¼ hour. After the charcoal has been removed by vacuum filtration, the filtrate is concentrated by evaporation to about half its volume and mixed with ether until crystallization sets in. The pyridoxal-5′-phosphate-diethylacetalhydrochloride, which precipitates thereafter, having been allowed to stand for 2 hours in an ice bath, is vacuum-filtered and dried. Yield: 145 g., M.P. 150° C. (decomposition).

145 g. of the thus-obtained diethyl acetal are dissolved in 400 ml. water (pH about 0.8). The solution is warmed for about 20 minutes to 50° C., then filtered over animal charcoal, and the filtrate is adjusted, under ice cooling, to a pH of 1.8. The reaction mixture is allowed to stand overnight at about 0–3° C. The precipitated pyridoxal-5′-phosphate is vacuum-filtered. This product does not exhibit a melting point but turns dark from 150° C. on. Yield: 92 g.;

$\lambda_{max.}$ 387; $E_{1\,cm.}^{1\%}$ 198.4

(in an aqueous solution at a pH of 6).

From the solution obtained during the isolation of the diethyl acetal, additional amounts of pyridoxal-5′-phosphate can be produced. For this purpose, the filtrate of the diethyl acetal is evaporated under reduced pressure. The thus-obtained oil is dissolved in 150 ml. water; the reaction mixture is subsequently heated for 20 minutes to about 60° C. and then filtered, with the addition of charcoal. The pH value of the filtrate is adjusted to about 1.8. After allowing the reaction mixture to stand for about 12 hours, the precipitated pyridoxal-5-phosphate is vacuum-filtered and washed with acetone. Yield: 17 g.

(c) 159 g. of the compound obtained in accordance with Example 1(a) are suspended in 600 ml. water. Under ice cooling and stirring, 25%-ammonia is added to the reaction mixture dropwise, until the pH value of the solution has risen to 7.2. After the addition of 10 g. charcoal, the mixture is additionally stirred for 15 minutes at 10–15° C. The charcoal is vacuum-filtered, and the pH value of the filtrate is adjusted to 1.8 by adding 25%-hydrochloric acid. The solution is concentrated at 40° C. external temperature under reduced pressure to 480–500 ml. After allowing the solution to stand overnight in a refrigerator, the precipitated pyridoxal-5′-phosphate is vacuum-filtered and washed with acetone. Yield: 106 g. From the mother liquors an additional 12 g. can be isolated.

Example 2

A phosphorylation mixture produced according to Example 1(a) is cooled, after hydrolysis with water, to about 50° C. and is maintained, after the addition of 70 g. paraldehyde, for 30 minutes at a temperature of about 50–55° C. After cooling of the reaction mixture, the pH value of the solution is adjusted to about 1.8 to 2 by adding aqueous KOH, and then the reaction mixture is allowed to stand overnight in a refrigerator. The thus-obtained 4H - 4-hydroxy-5-hydroxymethyl-2,8-dimethyl-m-dioxino[4,5-c]pyridine - 5-phosphate is vacuum-filtered and washed with water and acetone. Yield: 173 g. (=87% of theory). The substance does not possess a melting point, but turns dark starting from about 160–170° C.

Example 3

The phosphorylation mixture obtained according to Example 1(a) is hydrolyzed with water, as described in Example 1(a), and then stirred for 6 hours at room temperature with 75 g. propionaldehyde. The pH value of the solution is adjusted to 1.8 by the addition of dilute solution of sodium hydroxide, and the reaction mixture is stored in a refrigerator. The reaction product precipitating after about 24 hours, 4H-2-ethyl-4-hydroxy-5-hydroxymethyl - 8 - methyl - m - dioxino[4,5 - c]pyridine - 5-phosphate, is vacuum filtered and washed with water and acetone; M.P. 160–165° C. (decomposition). Yield: 110 g. (= 56% of theory).

Example 4

2 g. pyridoxal-5′-phosphate-oxime are heated with 30 ml. 40% formaldehyde solution for 1 hour on a steam bath. Thereafter, the pH of the solution is adjusted, by the addition of 2 N HCl, to 1.8 to 2. After allowing the mixture to stand for 12 hours at about 0° C., the precipitating 4H - 4 - hydroxy - 5 - hydroxymethyl - 8 - methyl-m - dioxino[4,5 - c]pyridine - 5 - phosphate is vacuum-filtered and washed with water and acetone.

Example 5

On a steam bath, there are heated for 1 hour 2 g. pyridoxal-5′-phosphate-semicarbazone with 40 cc. 40% formaldehyde solution and 30 ml. 2 N HCl. The reaction mixture is worked up as set forth in Example 4. A yield of 0.6 g. of the same product is obtained.

Example 6

(a) Analogously to Example 1(a), 200 g. pyridoxal oxazolidine are reacted to produce 4H-4-hydroxy-5-hydroxymethyl - 8 - methyl - m - dioxino[4,5 - c]pyridine-5-phosphate; yield: 161 g.

(b) 161 g. of the compound obtained according to Example 6(a) are boiled under reflux for ¼ hour in 400 ml. absolute ethanol containing 40 g. HCl, in the presence of 5 g. charcoal. The charcoal is filtered off in the hot state, and the filtrate is evaporated to dryness. The crystalline residue is dissolved in 250 ml. water, and the solution is heated for 20 minutes to 55–60° C., then mixed with 1 g. charcoal, filtered, and the filtrate adjusted to a pH of 1.8 by adding $NH_3$. The solution is allowed to stand overnight at about 0–3° C. The thus-obtained pyridoxal-5′-phosphate is vaccum-filtered and washed with acetone. Yield: 137 g.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A compound of the formula

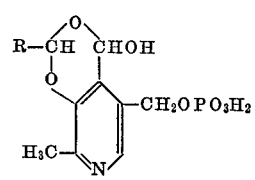

wherein R represents hydrogen, methyl, or ethyl.

2. A compound as defined by claim 1 wherein R is hydrogen.

3. A compound as defined by claim 1 wherein R is methyl.

4. A compound as defined by claim 1 wherein R is ethyl.

References Cited

Fieser and Fieser, Advanced Organic Chemistry, Rheinhold, pages 277, 441–442 (1961).

Karrer et al. Helv. Chim. Acta, vol. 30, pp. 524–30, 147.

Klingsberg, Pyridine and Derivatives, Part 4 Interscience, pages 132–133 (1964).

JOHN D. RANDOLPH, Primary Examiner

ALAN L. ROTMAN, Assistant Examiner

U.S. Cl. X.R.

260—292, 295, 296; 424—263